3,111,198
AUTOMATIC BRAKE ADJUSTER FOR SPOT-TYPE, LEVER ACTUATED DISC BRAKES

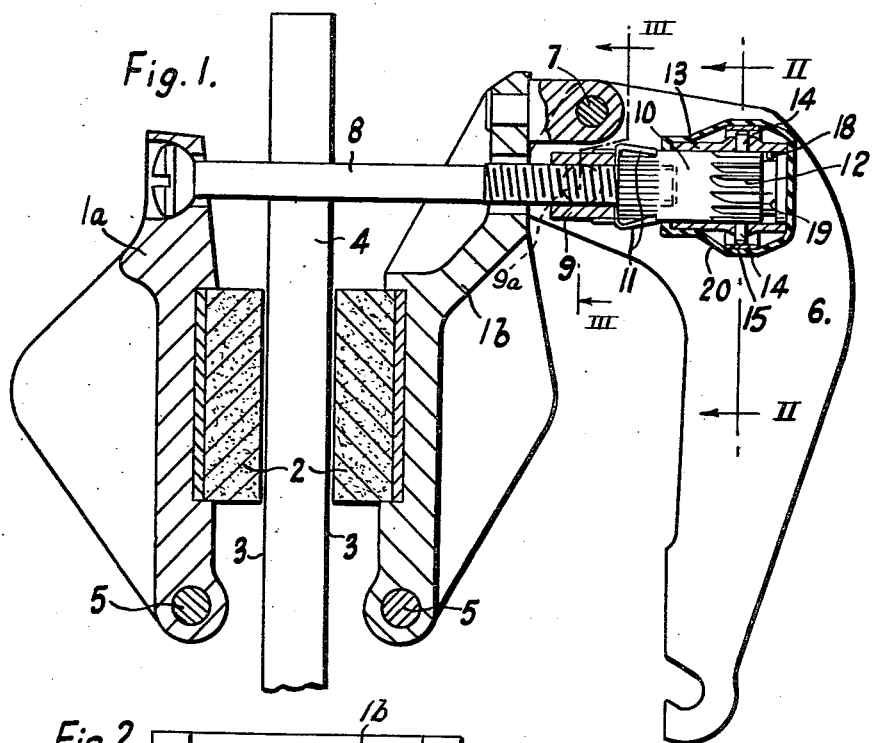
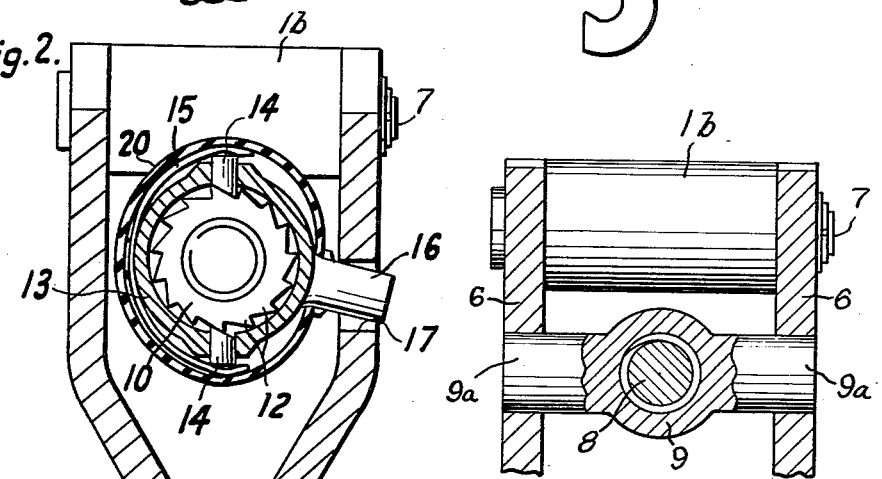
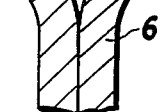

Harold Hodkinson, Coventry, England, assignor to Dunlop Rubber Company, Limited, London, England, a British company
Filed Feb. 7, 1962, Ser. No. 171,649
Claims priority, application Great Britain Feb. 9, 1961
6 Claims. (Cl. 188—72)

This invention relates to automatic brake adjusters of the ratchet and pawl type.

Automatic adjusters for brakes wherein adjustment of the brake is carried out on the release stroke of the brake are known. This type of adjuster makes use of the application stroke to cock a mechanism so that on the release stroke the cocked mechanism uncocks and in so doing adjusts the brakes so that manual correction for wear is unnecessary. The cocking mechanism can comprise a ratchet and a single pawl. However, the adjustment afforded by a ratchet and single pawl must necessarily be in steps and if fine step adjustment is required the ratchet must be made large so that a sufficient number of teeth can be formed on its periphery.

The object of the present invention is to provide an improved adjuster for a brake.

According to the present invention an automatic adjuster for a brake comprises an annular ratchet threadably engaging at its inner periphery with a brake-applying member and having on its outer periphery a plurality of ratchet teeth, two or more pawls spring-loaded towards said teeth at least one pawl being in operative engagement with a ratchet tooth at any one time and means associated with said pawls adapted, on disengagement of the brake, to rotate said ratchet on said brake-applying member to effect progressive adjustment of the brake.

Preferably the automatic adjuster has pawls equally spaced around a pawl carrier and the number of teeth on the ratchet is not divisible by the number of pawls on the carrier to form a whole number. Alternatively the number of teeth on the ratchet may be either of odd or even numbers and the pawls may be disposed at unequal intervals around the pawl carrier so that none of the pawls are in the same position on their respective teeth.

According also to the present invention a disc brake comprises a rotatable disc, a pair of axially-opposed friction pad assemblies movable to engage the disc between them, actuating means to effect said engagement and automatic wear adjusting means comprising a pawl carrier, a plurality of pawls mounted on said carrier, and a ratchet having a plurality of teeth, only one of said pawls being in engagement with a tooth of said ratchet at any one time, said pawl carrier being angularly movable by said actuating means to engage a pawl with a tooth on brake applying movement of said actuating means and to rotate said ratchet on a brake release movement of said actuating means to adjust the clearance of said pads from said disc.

Preferably the friction pad assemblies comprises pads of friction material and backing plates and these are mounted on pressure plates which are pivotable at one end on a non-rotatable structure and are disposed substantially chordally of the disc the other ends projecting beyond the outer periphery of the disc. A tie bar secured to the projecting end of one of the pressure plates extends across the plane of the disc and passes freely through a trunnion block trunnioned on a bifurcated operating lever itself pivoted on the projecting end of the other of the pressure plates and extending towards the pivot point of the latter. The end of the tie bar is threaded and a nut, engageable therewith, has a ratchet formed on its outer periphery and is encircled by a pawl carrier carrying a plurality of pawls engageable with the ratchet. The pawl carrier is angularly movable with respect to the nut and carries a projection which is engageable with the operating lever to enable rotation of the pawl carrier to take place with angular movement of the lever. Rotation of the nut in a wear compensating direction is adapted to shorten the effective length of the tie bar thereby closing the friction pads up to the disc.

Preferably also the entire automatic adjuster is protected by a sheath of elastomeric material.

The invention will now be described with reference to the accompanying drawing of which:

FIGURE 1 shows a cross-section of a disc brake incorporating the adjustment device of the present invention;

FIGURE 2 shows an enlarged cross-sectional view of the adjustment device on the line II—II in FIGURE 1; and FIG. 3 is a section on line III—III of FIG. 1.

A disc brake has a pair of pressure plates 1a and 1b pivotable to force friction pads 2 attached thereto into engagement with the braking surfaces 3 of a rotatable disc 4. The plates 1a and 1b are each pivoted at one end on a pivot point 5 on non-rotatable parts of the brake and the opposite ends project beyond the outer periphery of the disc 4. One pressure plate 1b has a lever 6 pivoted to it at its projecting end the lever extending from its pivot 7 towards the pivot points 5 of the pressure plates 1a and 1b. The pressure plate 1a has a tie bar 8 secured thereto which extends across the plane of the disc 4 adjacent the outer periphery thereof and through a trunnion block 9 mounted by means of trunnions 9a on the lever 6 inwardly adjacent the pivot 7 of the latter. Lever 6 is bifurcated (as shown in FIGURE 2) to pass on each side of the trunnion block 9 and adjuster at this point. The end of the tie bar 8 extending through the trunnion block 9 is threaded and a nut 10 is screwed on to it. The end of the nut 10 is knurled or fluted and a pair of metal spring fingers 11 extend from the trunnion block 9 into frictional engagement with the knurled end. Ratchet teeth 12 are formed on the outer surface of the nut 10 and are disposed so that their engagement and rotation by a pawl will shorten the effective length of the tie bar i.e. the distance between the end secured to the pressure plate 1a and the trunnion block 9. The number of teeth in this embodiment must be an odd number.

A pawl carrier 13 encircles the nut 10 and can move angularly relative thereto. A pair of pawls 14 disposed diametrically opposite each other are mounted in the pawl carrier 13 and are spring-loaded inwardly by a C-shaped spring 15 secured to the pawl carrier 13 intermediate its ends midway between the pawls 14 on one side of the carrier.

The pawl carrier 13 is provided with a projecting ear 16 (FIGURE 2) extending radially away from the centre of the adjuster and engaging in an aperture 17 formed in one of the arms of the bifurcated lever 6. The position of the aperture 17 on the lever 6 is such that there is a significant component of displacement of the aperture upwards when the lever is moved angularly about its pivot 7. The arm of the bifurcation chosen is the one which will tend to engage a pawl with a fresh tooth when the lever is pivoted to apply the brake. The aperture 17 is larger than the projecting ear 16 to provide a certain amount of free movement of the lever on the brake application stroke so that the normal friction pad clearance from the braking surfaces 3 of the disc 4 can be established on release of the brake. A return spring for the lever may be provided.

The pawl carrier 13 is permitted to move angularly with respect to the nut 10 but is prevented from sliding off the end of it by the engagement of a peg 18 (FIG- URE 1) attached to the pawl carrier 13 which engages a circumferentially-extending groove 19 in the nut 10.

A barrel-shaped flexible boot 20 is used to enclose the adjuster.

The operation is as follows. Movement of the lever 6 by a cable or the like at its free end will pivot the adjacent pressure plate 1b towards the disc 4 and will draw the opposite pressure plate 1a towards the disc 4 by means of the tie bar 8. If the brakes are not fully applied by the time the lever 6 has started to move the pawl carrier 13, the movement of the latter will start to move the pawls 14 up the reverse face of two of the teeth 12. If the brakes are fully engaged before one of the pawls 14 drops into engagement with a fresh tooth 12 no adjustment for friction pad wear will take place. If wear is sufficient to allow enough movement to take place to engage a pawl 14 behind a fresh tooth 12 then release movement of the lever 6 will turn the pawl carrier and the nut will rotate with it due to the engagement of the pawl 14 with the fresh tooth 12. The nut 10 is rotated by such a movement in a direction which will shorten the effective length of the tie bar 8 thus bringing the pads nearer to each other and to the disc so that an excessive travel of the operating lever is never necessary. The spring fingers 11 prevent reverse movement of the nut 10.

The ratchet device is sufficiently compact as to be capable of being protected from foreign matter by the barrel-shaped flexible boot 20. The mechanism may be packed in grease and covered with the boot and mounted on the brake and will operate satisfactorily despite grit, mud, water and de-icing chemicals which normally cause difficulties of brake adjuster operation.

As an alternative the ratchet may contain an even number of teeth e.g. sixteen and two pawls may be positioned to that when one pawl is fully engaged with a tooth the other pawl is half-way up the reverse slope of its respective tooth. Further the ratchet in another embodiment may have an odd number of teeth operated on by two pawls not diametrically opposed as in the illustrated embodiment but again positioned so that one pawl is not fully in engagement with its tooth when the other is.

Having now described my invention, what I claim is:

1. A disc brake comprising a rotatable disc, a non-rotatable support, a pair of pressure plates pivotally mounted on said non-rotatable support and extending chordally of said disc to project beyond the outer periphery thereof, a pair of axially-opposed friction pad assemblies detachably secured to the pressure plates, a bifurcated operating lever pivoted at its end to the projecting end of one pressure plate, a trunnion block trunnioned in the bifurcation adjacent the pivoted end thereof, a tie-bar secured to the projecting end of the other pressure plate and extending across the plane of the disc to pass through the trunnion block and having a threaded portion projecting beyond said trunnion block, a nut threaded onto said threaded portion of said tie-bar adjacent said trunnion block and formed on its outer periphery as a ratchet, a pawl carrier encircling the nut and movable circumferentially thereof, and at least two pawls mounted on said pawl carrier so positioned that only one will operatively engage a tooth of said ratchet at any one time to rotate said nut against said trunnion block.

2. A disc brake as claimed in claim 1 wherein the pawl carrier is provided with a projecting ear in position to engage an aperture in one of the bifurcations of the lever and is movable by the edges of the aperture in both directions relative to said nut.

3. A disc brake as claimed in claim 2 wherein said aperture is larger than the projecting ear to provide for free movement of the lever corresponding to the amount of clearance required between the braking surfaces of the friction pad and the disc when the brake is inoperative.

4. A disc brake as claimed in claim 1 wherein the pawls are mounted on and are equally spaced around the pawl carrier and the number of teeth on the ratchet is indivisible by the number of pawls on the carrier to form a whole number.

5. A disc brake as claimed in claim 1 wherein the pawls are mounted on and are unequally spaced around the pawl carrier.

6. A disc brake according to claim 4 wherein said plurality of pawls comprises two.

References Cited in the file of this patent

UNITED STATES PATENTS

| | | |
|---|---|---|
| 893,220 | Anderson | July 14, 1908 |
| 988,091 | Hammersley | Mar. 28, 1911 |
| 1,811,914 | Browall | June 30, 1931 |
| 1,837,457 | Lyden | Dec. 22, 1931 |
| 1,852,174 | Lyman et al. | Apr. 5, 1932 |
| 2,669,327 | Chamberlain et al. | Feb. 16, 1954 |

FOREIGN PATENTS

| | | |
|---|---|---|
| 649,459 | Germany | Aug. 25, 1937 |
| 1,097,309 | France | Feb. 16, 1955 |
| 1,246,519 | France | Oct. 10, 1960 |
| 778,177 | Great Britain | July 3, 1957 |